United States Patent [19]

Cottle

[11] Patent Number: 5,722,619
[45] Date of Patent: Mar. 3, 1998

[54] PARACHUTE BRIDLE AND METHOD OF DEPLOYING A PARACHUTE

[75] Inventor: Michael W. Cottle, San Diego, Calif.

[73] Assignee: Fliteline Systems, Inc., Costa Mesa, Calif.

[21] Appl. No.: 582,309

[22] Filed: Jan. 3, 1996

[51] Int. Cl.⁶ .............................. B64D 17/64; B64D 17/74
[52] U.S. Cl. ........................... 244/148; 244/142; 244/149
[58] Field of Search ........................... 244/142, 145, 244/148, 149

[56] References Cited

U.S. PATENT DOCUMENTS

| | | | |
|---|---|---|---|
| 1,186,230 | 6/1916 | Riches | 244/142 |
| 1,394,201 | 10/1921 | Lemon | 244/149 |
| 2,149,540 | 3/1939 | Muller | 244/142 |
| 2,206,910 | 7/1940 | McCarroll | 244/142 |
| 2,979,294 | 4/1961 | Buss | 244/148 |
| 3,055,621 | 9/1962 | Martin | 244/142 |
| 3,291,423 | 12/1966 | Britton, Jr. | 244/149 |
| 3,511,458 | 5/1970 | Rolandelli | 244/142 |
| 5,253,826 | 10/1993 | Coltman et al. | 244/149 X |

FOREIGN PATENT DOCUMENTS 214975  5/1958  Australia ................ 244/148

*Primary Examiner*—William Grant
*Attorney, Agent, or Firm*—Stephen A. Gratton

[57] ABSTRACT

An improved parachute bridle assembly and an improved method for deploying a parachute are provided. The improved bridle assembly includes a bridle having a main pilot chute attached at a distal end thereof, and a second pilot chute attached to the bridle at about a midpoint thereof. The second pilot chute is spaced from the main pilot chute by a distance that allows the second pilot chute to enter the airstream independently of the main pilot chute. In use of the bridle assembly, deployment is initiated by spring ejection of the main pilot chute into the airstream. Thereafter, the second pilot chute is ejected into the airstream. The pilot chutes pull a deployment bag from the harness container thereby extracting the main canopy.

13 Claims, 4 Drawing Sheets

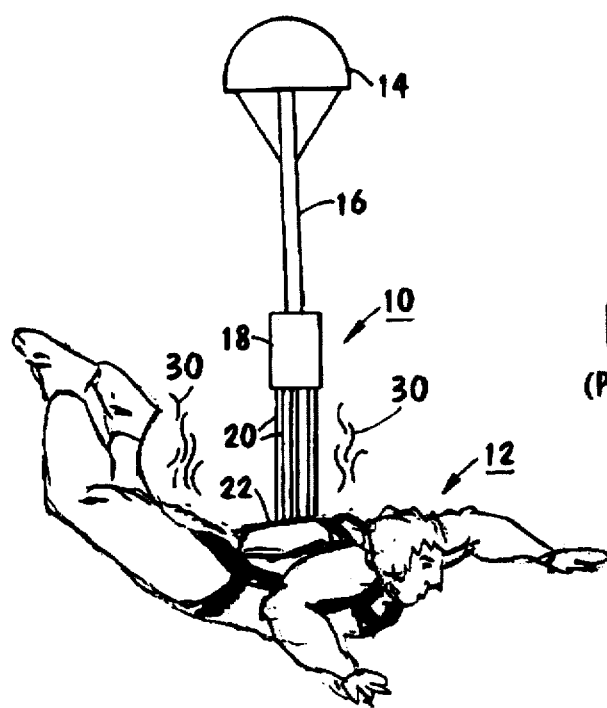
Fig. 1
(PRIOR ART)
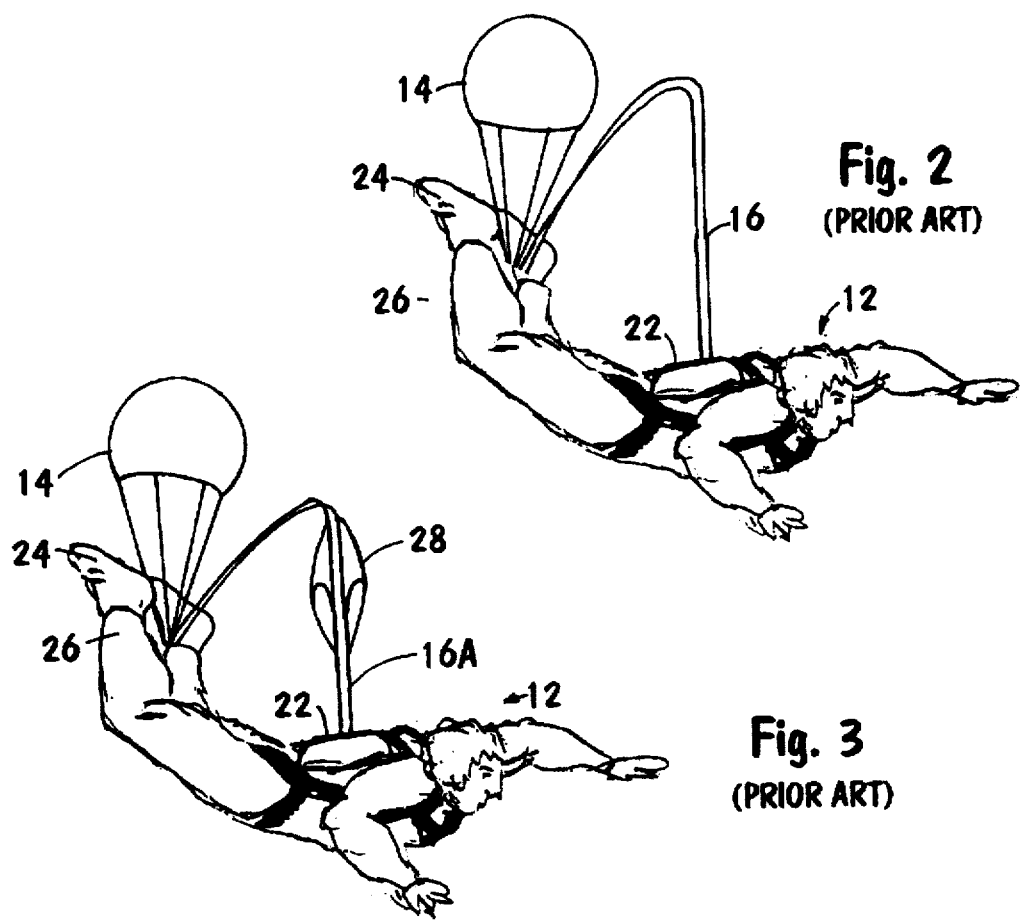
Fig. 2
(PRIOR ART)
Fig. 3
(PRIOR ART)

PARACHUTE BRIDLE AND METHOD OF DEPLOYING A PARACHUTE

FIELD OF THE INVENTION

The present invention relates to parachutes and their deployment systems. More specifically, the present invention relates to an improved parachute bridle assembly having two pilot chutes.

BACKGROUND OF THE INVENTION

Over the years, parachutes and their deployment systems have evolved in an effort to achieve uniform satisfactory deployments of the parachutes. To achieve uniform deployments, it is necessary that the canopy and the lines deploy from the parachute harness container in an orderly and predetermined manner.

One of the biggest hurdles to a smooth deployment is the proper extraction of the canopy and the associated lines from the harness container. Early on, it became common practice to pull the canopy and lines from the harness container by use of a small parachute termed a pilot chute. The pilot chute was typically launched into the airstream which then, through the use of a bridle connecting the canopy and the pilot chute, pulled the main chute and its associated lines from the harness container.

A proper deployment is depicted in FIG. 1. As is shown in FIG. 1, a prior art parachute assembly is Generally indicated with the numeral 10. The parachutist is indicated with the numeral 12. As can be seen from FIG. 1, the pilot chute 14 is attached to a bridle 16 which has pulled out deployment bag 18 containing the canopy and the associated lines 20. In FIG. 1, the parachute components have already been ejected from the parachute harness container 22. As is indicated, the pilot chute 14 has fully extended the bridle 16 away from the parachutist 12 and the lines 20 are beginning to be pulled from the deployment bag 18.

Occasionally, the prior art parachute assemblies did not operate as intended. Most commonly this occurred during what is known as an unstable deployment or during unintentional tumbling of the parachutist 12. In this situation, the pilot chute 14 may eject from the harness container, but become entangled in the parachutist or otherwise not properly deploy. An example of such an occurrence is shown in FIG. 2.

Referring now to FIG. 2, a parachutist 12 is shown wearing a parachute assembly 10 that includes a harness container 22 from which a bridle 16 has been pulled. As before, the pilot chute 14 is attached to the remote or distal end of the bridle 16. However, in this case the pilot chute 14 has become entangled in the parachutist's feet 24 and legs 26. Because of the entanglement, the force resulting from the pilot chute 14 is lost and is no longer applied to the deployment bag 18 (FIG. 1) to pull the bag from the harness container 22. In this improper deployment, the main canopy does not deploy which could result in a fatal disaster.

In the past, several attempts have been made to increase the air resistance of the bridle in the airstream in an attempt to produce enough resistance to have the bridle pull the bag and thus the canopy and the associated lines from the harness container. One early attempt was merely to increase the width of the bridle such that it was an elongated strap having several inches of width. One example of this type of bridle is shown in *Parachute Manual*, 3rd Edition, at pages 266–267. In this discussion, the "horseshoe capability" of the bridle is set forth. In the sequential drawings on page 266, the pilot chute is shown to snag, but the bag is still ejected from the harness by the drag of the "special bridle."

Despite the increased drag of the "wide" bridle, proper deployment still was not guaranteed. Accordingly, to yet further increase the drag, pouches or pockets were attached to the bridle along its length. This type of design is shown in FIG. 3.

With reference to FIG. 3, a parachutist 12 is shown wearing a parachute assembly that includes a harness container 22. Extending from the harness container 22 is a bridle 16A having a pilot chute 14 attached to its distal end. As was the case in FIG. 2, the pilot chute has become entangled in the parachutist's feet 24 and legs 26. The bridle 16A includes a pair of pockets or pouches 28 attached to the bridle 16A along its length. It was believed that these pockets 28 would provide sufficient resistance to force the bag from the harness container 22. Unfortunately, this assembly still has not produced the level of reliability desired for consistent, proper deployments.

Occasionally, during improper deployments of pilot chutes, the pilot chute becomes entrapped in a burble created by the parachutist instead of entering the airstream. As shown in FIG. 1, a burble 30 is the low pressure region behind the parachutist 12 produced by the parachutist 12 traveling through the air at a relatively high velocity. Should the pilot chute 14 become entrapped in the burble, it is normally sucked up against the parachutist and is prevented from entering the airstream. If this occurs, the pilot chute 14 does not withdraw the bridle 16 or the deployment bag 18 from the harness container 22 thus resulting in an unsuccessful deployment.

In an attempt to overcome this problem, bridle designers felt that adding an additional pilot chute 14 at the distal end of the bridle 16 would prevent the burble 30 from adversely affecting the deployment. This design is described in *Parachute Manual*, 3rd Edition, at pp. 340–341. It was believed that through the use of dual pilot chutes, both of which were spring loaded and which were either attached side by side, or in tandem at the end of the bridle, one pilot chute or the other would properly deploy and enter the airstream. Unfortunately, this design has not proven to successfully overcome the burble problem much less overcome the problem of entanglement of the pilot chute 14 with the parachutist 12. Instead, this design has shown that in the event one pilot chute 14 enters the burble 30, most likely the other pilot chute will likewise become entrapped in the burble 30 thus failing to produce a successful deployment. Moreover, if one pilot chute 14 becomes entangled in the parachutist 12, generally the other pilot chute 14 likewise will become entangled or will, through attachment to the bridle 16 adjacent the first pilot chute 14 have insufficient play to result in removal of the bridle 16 from the harness container 22 and thus deployment of the canopy.

In view of the deficiencies in the prior art, the present invention is directed to an improved bridle assembly having a second pilot chute constructed and placed to increase the drag created by the midsection of the bridle should the pilot chute become entangled with the parachutist. It is thus an object of the present invention to provide a highly reliable deployment system for parachutes incorporating the use of two pilot chutes spaced at different parts of the bridle to deploy a deployment bag. It is still further an object of the present invention to provide an improved bridle assembly having two pilot chutes that can be incorporated into existing parachute designs. Still further, it is an object of the present invention to provide a bridle assembly that is relatively easy to manufacture, reliable in use and relatively cost effective.

Other objects, advantages and capabilities of the present invention will become more apparent as the description proceeds.

SUMMARY OF THE INVENTION

In accordance with the present invention, an improved parachute bridle assembly and an improved method for deploying a parachute are provided. The parachute bridle assembly includes a parachute bridle having two separate pilot chutes. As is the case for standard bridles, a spring loaded pilot chute is attached to the first end of the bridle. In addition, a second pilot chute is attached to the bridle and is adapted to enter the airstream separately than the main pilot chute. The second pilot chute is attached somewhere along the length of the bridle in spaced relation to the first pilot chute. This second pilot chute includes a canopy and a means for attaching the canopy to the bridle. In the illustrative embodiment, the attaching means comprises radial lines and a center line collectedly and attached to a loop assembly. In addition, a deployment bag is attached to the bridle for containing a parachute canopy and its associated lines. The deployment bag is extracted from a harness container by force exerted by the pilot chutes.

With a bridle assembly constructed in accordance with the invention, should the main pilot chute become entangled in the parachutist or otherwise improperly deployed, the second pilot chute creates sufficient drag to withdraw the deployment bag from the harness container. The unsuccessful deployment of the main pilot chute is thus of no consequence.

A deployment sequence for a parachute assembly constructed in accordance with the invention is as follows. Initially, the main pilot chute is extracted from the harness container into the airstream. Next, the secondary pilot chute is extracted from the harness container into the airstream separately from the main pilot chute. Finally the deployment bag is pulled away from the harness container along with the lines for the main canopy. Once the canopy lines are withdrawn, the canopy is pulled out of the deployment bag and the canopy is ejected into the airstream. Once the main canopy enters the airstream, the canopy opens and the parachute is deployed.

BRIEF DESCRIPTION OF THE DRAWINGS

FIG. 1 shows a parachutist using a prior art parachute assembly incorporating a standard bridle pilot chute assembly;

FIG. 2 shows a parachutist utilizing a prior art parachute assembly wherein the pilot chute has become entangled in the parachutist;

FIG. 3 shows a parachutist utilizing and being entangled in a prior art bridle assembly incorporating air pockets or pouches;

DETAILED DESCRIPTION OF THE PREFERRED EMBODIMENTS

Figure 4:
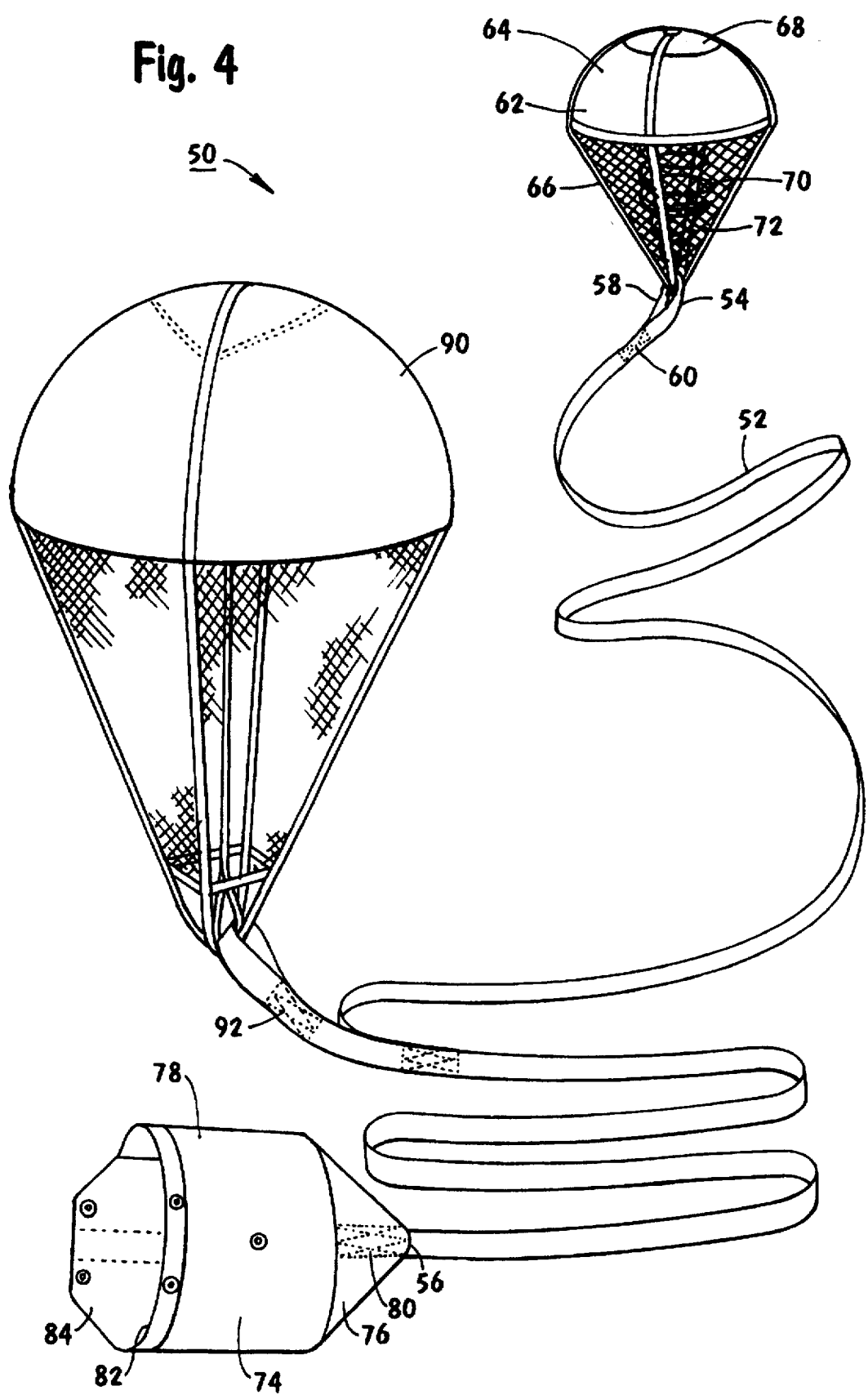
FIG. 4 is a perspective view of the improved bridle assembly of the present invention.

Referring initially to FIG. 4, the improved bridle assembly of the present invention is shown and generally designated 50. Bridle assembly 50 includes a bridle 52 which is preferably made of a flat elongated piece of material like cloth webbing or tape. While the bridle 52 is preferably approximately 2–4 inches wide and 10–15 feet in length, those skilled in the art will appreciate that different widths or lengths may be appropriate for different configurations. Preferably, the bridle is designed to withstand at least a lateral force of several pounds or more, or such amount as may be required to withstand the forces incurred during deployment.

Bridle 52 has a distal or first end 54 and a proximal or second end 56. Distal end 54 is preferably constructed such that the material folds back over itself to form a loop 58. The end of bridle 52 is attached to the bridle by sewing using stitches 60 or other means such as riveting, bolting, bonding or other means known to those skilled in the art.

Connected to loop 58 is a standard pilot chute 62. Pilot chute 62 includes a canopy portion 64 and a plurality of lines 66. Canopy portion 64 preferably includes a hardened cap 68. Canopy 64 is preferably made of nylon, and lines 66 are preferably made of nylon. Cap 68 is preferably made of a durable material such as plastic or a graphite composite, although a metal cap could be used as well.

While lines 66 are shown to extend up along the outer surface of canopy 64, those skilled in the art will appreciate that the lines 66 can be attached at the periphery or mouth of the canopy 64. Contained within the canopy 64 is an ejecting spring 70. Ejecting spring 70 is used to physically propel pilot chute 62 away from the harness container 22 (FIG. 7) worn by the parachutist 12. When the pilot chute 62 is stored, spring 70 is in a compressed configuration which, upon pulling of the ripcord, is released and results in ejection of the pilot chute 62 into the airstream.

Pilot chute 62 further includes a mesh material 72 connecting the various lines 66. In this manner, once the pilot chute is ejected from the harness container 22 (FIG. 1), the spring 70 is contained within the pilot chute assembly.

Figure 5:
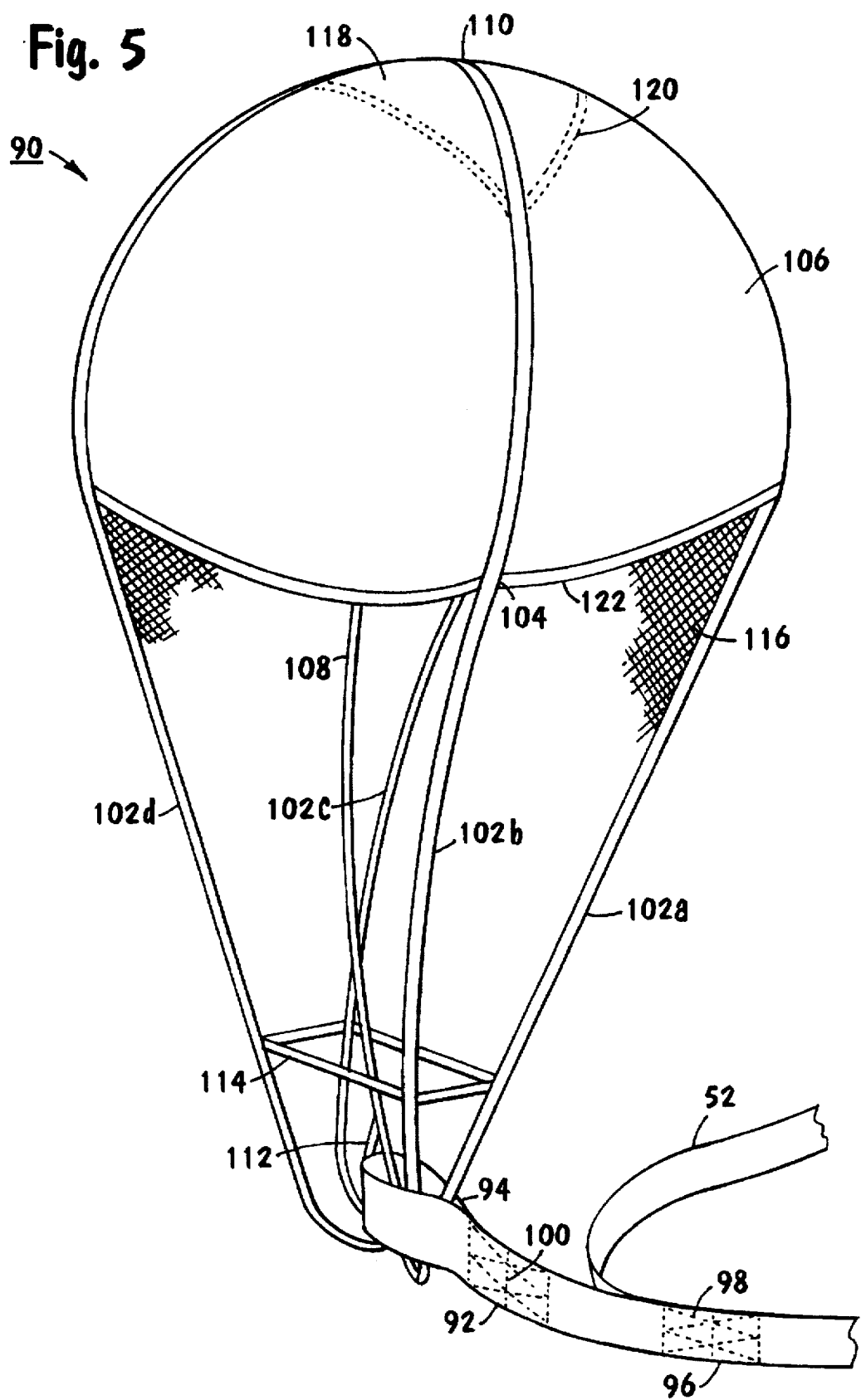
FIG. 5 is a perspective view of the secondary pilot chute of the present invention attached to the bridle.
Figure 7:
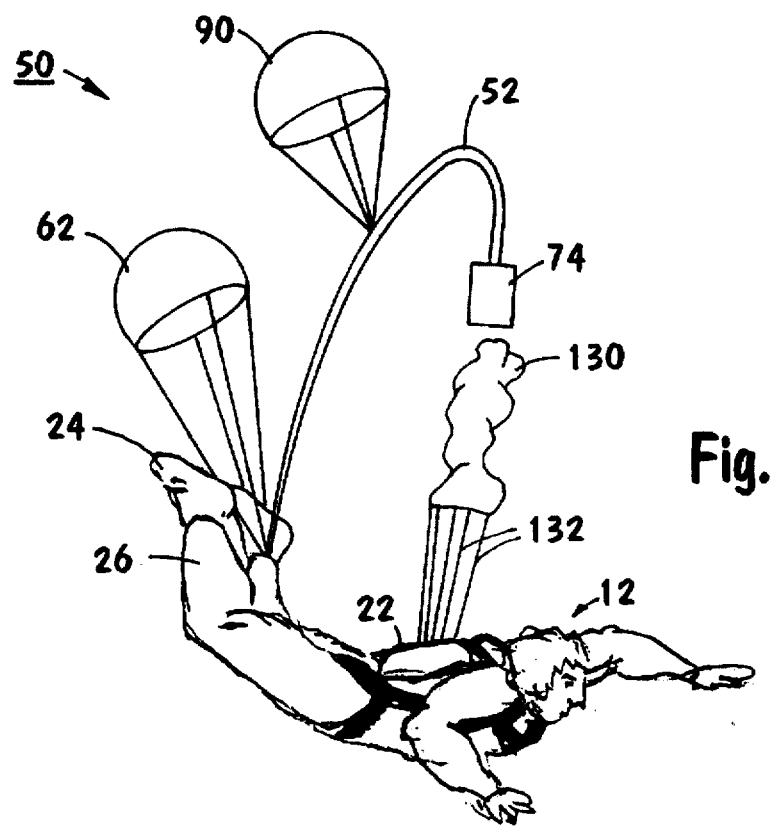
FIG. 7 shows a parachutist utilizing the improved bridle of the present invention wherein the main parachute canopy and canopy lines have been withdrawn from the deployment bag.

Attached to the proximal end 56 of bridle 52 is a deployment bag 74. Deployment bag 74 consists of a base portion 76 and a top portion 78. Deployment bag 74 is attached to the distal end 56 of the bridle 52 using stitches 80. Alternately, riveting or bonding or fastening through other means as are well known to those skilled in the art can be used. Deployment bag 74 is sized to fit within the harness container 22 (FIG. 7) to receive the main parachute canopy 130 (FIG. 7) as well as the associated canopy lines 132 (FIG. 7). The canopy 130 and canopy lines 132 are inserted through a mouth portion 82 of deployment bag 74. Once the canopy 130 and canopy lines 132 are stowed within the deployment bag 74, closing flap 84 is brought over mouth 82 such that the opening is substantially covered. When deployment bag 74 is in the closed configuration, the lines 132 of the main parachute canopy 130 extend out of mouth 82 and are connected to the harness container 22 which is strapped onto the parachutist 12. Attached to the bridle 52 is a second pilot chute 90 which does not include an ejecting spring. An exemplary means for attaching the second pilot chute 90 to the bridle 52 is illustrated in FIGS. 4 and 5. However, this is an exemplary attaching means but others could be used. In the illustrative embodiment, the secondary pilot chute 90 is attached to bridle 52 by a connecting loop 92. Connecting loop 92 is attached to bridle 52 at about the mid point of the bridle 52. In this configuration the second pilot chute 90 is spaced from the standard pilot chute 62 by some distance that allows the second pilot chute 90 to enter the airstream independently of the standard pilot chute 62. In the illustrative embodiment this distance is several feet but can be less than or greater than this amount (e.g., one foot or more). The second pilot chute is preferably located between about the middle third of the bridle 52 measured from the distal end 54 to about the middle third of the bridle 52 measured from the proximal end 56.

The various components and features of the secondary pilot chute 90 are best seen in FIG. 5. As can be seen in FIG. 5, connecting loop 92 has a loop portion 94 and a tab portion 96. Tab portion 96 is attached to bridle 52. Preferably, tab portion 96 is attached to bridle 52 by means of stitching 98 or other means known in the arts as riveting, bolting, bonding, etc.

Loop portion 94 of connecting loop 92 is formed by folding over the material of loop connector 92 and fastening the end to the middle section of loop connector 92. The end is fastened to the middle portion by stitching 100 or other means such as bonding, bolting, riveting, etc. which are well known to those skilled in the art. Connecting loop 92 is preferably made of material similar to that of the bridle 52, although other materials could be used as well. Connecting loop 92 is of a sufficient length to allow attachment of the lines as described below.

Attached to loop portion 94 of connecting loop 92 are a plurality of lines. These lines include radial lines 102a–d. Radial lines 102 are attached to the outer edge 104 of canopy 106. While radial lines 102 are shown to extend all the way to the center of canopy 106, those skilled in the art will appreciate that for certain configurations the lines 102 may not extend all the way up and may only be attached at the outer edge 104. Preferably the lines 102 are bonded to the canopy from outer edge 104 to their end by stitching, bonding, or other means known to those skilled in the art. In the present embodiment, the radial lines 102a–d are preferably made of nylon. Preferably, edge 104 includes a reinforcing strip 122 to which radial lines 102 are attached. As those skilled in the art will appreciate, while four radial lines 102 are shown, more or less radial lines could be used depending on the configuration of pilot chute. The exact number of radial lines 102 necessary can be determined by those skilled in the art.

In addition to radial lines 102, center line 108 extends from the loop portion 94 of connecting loop 92 all the way to the center 110 of canopy 106. Center line 108 is attached to center 110 by stitching, bonding, riveting or other means known to those skilled in the art. Preferably center line 108 extends through loop 94 and attaches back onto itself at attachment point 112. The purpose of center line 108 is to flatten the curvature of the canopy 106 during deployment to provide more uniform and faster inflation of the canopy 106. Additionally, while only one center line 108 is shown, it may be beneficial for certain configurations to have more than one center line connecting the loop portion 94 to the center 108. Also connecting radial lines 102a–d is a reinforcing strip 114. The purpose of reinforcing strip 114 is to reinforce the mouth area at the pilot chute base. Connected to outer edge 104 and radial lines 102, is a mesh 116. The purpose of mesh 116 is to prevent tangling of radial lines 102 while still allowing air flow to the canopy 106.

While only a cutaway of the mesh 116 is shown in FIG. 5, the mesh preferably extends from radial line to radial line and from the outer edge 104 of canopy 106 nearly to the point where the radial lines 102 attach to loop portion 94.

The top or center portion of canopy 106 includes a reinforcing patch 118 (only stitching for the patch is visible in FIG. 5). Reinforcing patch 118 is attached to canopy 106 by stitching 120 or by bonding, riveting, or other means known to those skilled in the art. The purpose for reinforcing patch 118 is to spread the opening force applied by center line 108 to the canopy 106 over a greater area.

METHOD OF THE PRESENT INVENTION

Figure 6:
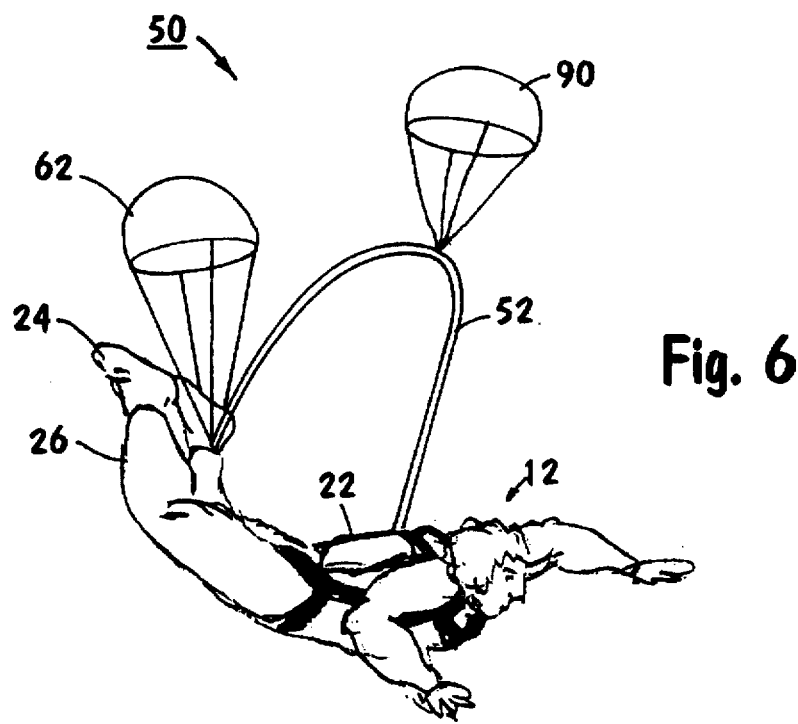
FIG. 6 shows a parachutist using the improved bridle of the present invention.

Referring now to FIGS. 6 and 7, the method of the invention is illustrated. In accordance with the method of the present invention, a harness container 22 containing a parachute canopy 130, canopy lines 132 and the improved bridle assembly 50 set forth above, is provided. After the parachutist 12 pulls the ripcord which releases the closures of the harness container 22, the ejecting spring of the pilot chute 62 ejects the pilot chute 62 into the airstream. The drag created by the pilot chute 62 in the airstream pulls the bridle 52 out of the harness container 22 and pulls the secondary pilot chute 90 out into the airstream. The combined drag created by the pilot chute 62, the bridle 52 and the second pilot chute 62 then pull the deployment bag 74 out of the harness container 22 and allow the main canopy lines 132 to be uniformly extracted from the deployment bag 74. When all the lines have been extracted, the main parachute canopy 130 is extracted from the deployment bag 74 and the main canopy 130 is exposed to the airstream and opens. The foregoing represents the ideal and desired deployment of a parachute using the improved bridle assembly of the present invention.

In the unfortunate event that either the pilot chute 62 or the bridle 52 become entangled with the parachutist 12 or otherwise unsuccessfully deploy, i.e., for example, get caught in the burble 30 (FIG. 1) created by the parachutist 12, the drag created by the bridle 52 in the airstream, while not necessarily sufficient to extract the deployment bag 74 from the harness container, is of sufficient magnitude to extract a portion of the bridle 52 and the second pilot chute 62. The resistance caused by the combination of the second pilot chute 62 and the bridle is sufficient to extract the deployment bag 74 from the harness container 22.

In this manner, even though the pilot chute 62 remains entangled with the parachutist 12 or otherwise unsuccessfully deploys, the deployment bag 74 is ejected from the harness container 22 and the drag on the bridle 52, the deployment bag 74 and the exposed lines are sufficient to separate the deployment bag 74 from the lines at first and then the canopy 130 itself. Once the canopy 130 is pulled from the deployment bag, it is exposed to the airstream and opens. Thus the invention provides an improved parachute bridle assembly as well as an improved method of deploying a parachute. Although the improved bridle assembly and the method of the present invention have been described with reference to certain preferred embodiments and/or preferred methods, as will be apparent to those skilled in the art, certain changes and modifications can be made without departing from the scope of the invention as defined by the following claims.

What is claimed is:

1. A parachute bridle assembly comprising:
   a parachute bridle having a first end and a second end, said second end attached to a deployment bag contained within a harness container having a main parachute canopy therein;
   a first pilot chute attached to the first end of the bridle; and
   a second pilot chute attached to the bridle between the first end and the second end, said second pilot chute spaced from the first pilot chute by a distance sufficient to allow the first and second pilot chutes to enter an airstream separately, said second pilot chute configured to exert a drag in the airstream to extract and separate the deployment bag from the harness container while the bridle remains attached to the deployment bag and the main parachute canopy deploys.

2. The bridle assembly as claimed in claim 1 wherein the second pilot chute is attached to the bridle at about a midpoint of the bridle.

3. The method as claimed in claim 1 wherein the second pilot chute is attached to the bridle at a point between a first third of the bridle measured from the first end and a second third of the bridle measured from the second end.

4. The bridle assembly as claimed in claim 1 wherein the second pilot chute is spaced from the first pilot chute by at least one foot.

5. The bridle assembly as claimed in claim 1 wherein the second pilot chute is spaced from the first pilot chute by several feet.

6. A bridle assembly for a parachute comprising:

a parachute bridle having a first end and a second end, said second end attached to a deployment bag contained within a harness container having a main parachute canopy;

a first pilot chute attached to the first end of the bridle; and a second pilot chute attached to the bridle and spaced from the first pilot chute by a distance sufficient to allow the second pilot chute to enter an airstream separately from the first pilot chute, said second pilot chute comprising a chute canopy and a plurality of lines connecting the chute canopy to the bridle, said second pilot chute configured to exert a drag in the airstream to extract and separate the deployment bag from the harness container while the bridle remains attached to the deployment bag and the main parachute canopy deploys.

7. The bridle assembly as claimed in claim 6 wherein the chute canopy comprises a center and an outer edge and the plurality of lines comprises at least one center line connected to the center of the chute canopy and at least one radial line connected to the outer edge of the chute canopy.

8. The bridle assembly as claimed in claim 7 further comprising a connecting loop including a loop portion and a tab portion, said tab portion sewn to the bridle and the loop portion connected to the lines.

9. The bridle assembly as claimed in claim 8 further comprising a reinforcing patch, said reinforcing patch attached to the center of the canopy.

10. The bridle assembly as claimed in claim 6 wherein the second pilot chute is separated from the first pilot chute by at least one foot.

11. A method of deploying a main parachute canopy comprising:

providing a harness container containing a deployment bag with the main parachute canopy therein and a bridle attached to the deployment bag;

providing a first pilot chute attached to an end of the bridle and a second pilot chute attached to the bridle in spaced relation to the first pilot chute, said second pilot chute configured to enter an airstream independently of the first pilot chute and exert a drag sufficient to extract and separate the deployment bag from the harness container while the bridle remains attached thereto and the main parachute canopy deploys; and extracting the deployment bag from the harness container and deploying the main parachute canopy from the deployment bag using the drag applied by the second pilot chute as the first pilot chute and second pilot chute remain attached to the bridle.

12. The method as claimed in claim 11 wherein the first and second pilot chutes are spaced by a distance of at least one foot.

13. The method as claimed in claim 11 wherein the second pilot chute is attached to the bridle at about a midpoint of the bridle.

* * * * *